United States Patent [19]

Iinuma

[11] 4,276,544
[45] Jun. 30, 1981

[54] CODE CONVERTING CIRCUITS

[75] Inventor: Kazumoto Iinuma, Tokyo, Japan

[73] Assignee: Nippon Electric Co., Ltd., Tokyo, Japan

[21] Appl. No.: 31,987

[22] Filed: Apr. 20, 1979

[30] Foreign Application Priority Data

Nov. 8, 1978 [JP] Japan ............................. 53-137494

[51] Int. Cl.$^3$ ............................................. H04N 7/12
[52] U.S. Cl. ............................. 340/347 DD; 358/133; 358/261
[58] Field of Search ................ 340/347 DD; 358/123, 358/133, 138, 261; 179/15 AP, 15 AF, 15 BW

[56] References Cited

U.S. PATENT DOCUMENTS

| 3,646,257 | 2/1972 | Epstein et al. ....................... 358/261 |
| 4,092,665 | 5/1978 | Saran ................................ 179/15 AF |
| 4,125,746 | 11/1978 | Downey et al. ................. 179/15 AF |
| 4,131,915 | 12/1978 | Nakagome et al. .................. 358/260 |
| 4,149,192 | 4/1979 | Takeuchi ............................. 358/261 |
| 4,185,302 | 1/1980 | Mounts et al. ....................... 358/261 |

Primary Examiner—Charles E. Atkinson
Assistant Examiner—E. S. Kemeny
Attorney, Agent, or Firm—Claude A. S. Hamrick

[57] ABSTRACT

Code converting circuits for facsimile and other information communications systems in which run length codes are converted to codes having variable lengths and the variable length codes are converted into a word code train, wherein each word comprises N bits, and the converted word code train is stored or transmitted. The code converting circuit consists of a code converter for converting parallel input codes (run length codes of fixed lengths) into variable length codes, a multiplexer and shift register for converting the variable length codes (and dummy codes where needed) into word length codes of fixed length, a multiplexer for outputting the word length codes to a memory interjecting a synchronizing code at predetermined intervals, and control signal generating circuitry for controlling the various circuit components. A decoding circuit is also disclosed for reconstructing the original run length codes from the word length codes. In addition, a second embodiment is disclosed which uses a parallel signal processing technique and is particularly adapted for encoding and decoding television video signals.

7 Claims, 45 Drawing Figures

FIG. 9

| INPUT TERMINAL OF SHIFTER 38 \ OUTPUT (CODE LENGTH) OF 366 / OUTPUT TERMINAL OF SHIFTER 38 | 000 | | | 001 | | | 010 | | | 011 | | | 100 | | |
|---|---|---|---|---|---|---|---|---|---|---|---|---|---|---|---|
| | $O_1$ | $O_2$ | $O_3$ | $O_1$ | $O_2$ | $O_3$ | $O_1$ | $O_2$ | $O_3$ | $O_1$ | $O_2$ | $O_3$ | $O_1$ | $O_2$ | $O_3$ |
| $I_1$ | 0 | | | | | | | | | | | | | | |
| $I_2$ | | 0 | | 0 | | | | | | | | | | | |
| $I_3$ | | | 0 | | 0 | | 0 | | | | | | | | |
| $I_4$ | | | | | | 0 | | 0 | | 0 | | | | | |
| $I_5$ | | | | | | | | | 0 | | 0 | | 0 | | |
| $I_6$ | | | | | | | | | | | | 0 | | 0 | |
| $I_7$ | | | | | | | | | | | | | | | 0 |

FIG. 10

| OUTPUT OF 334 | 00 | | | | 01 | | | | 10 | | | | 11 | | | |
|---|---|---|---|---|---|---|---|---|---|---|---|---|---|---|---|---|
| OUTPUT TERMINAL OF SHIFTER 40 / INPUT TERMINAL OF SHIFTER 42 | $O_{11}$ | $O_{12}$ | $O_{13}$ | $O_{14}$ | $O_{11}$ | $O_{12}$ | $O_{13}$ | $O_{14}$ | $O_{11}$ | $O_{12}$ | $O_{13}$ | $O_{14}$ | $O_{11}$ | $O_{12}$ | $O_{13}$ | $O_{14}$ |
| $I_{11}$ | | | | | | | | | | | | | 0 | | | |
| $I_{12}$ | | | | | | | | | | | | | | 0 | | |
| $I_{13}$ | | | | | 0 | | | | | | | | | | 0 | |
| $I_{14}$ | 0 | | | | | 0 | | | | | | | | | | 0 |
| $I_{15}$ | | 0 | | | | | 0 | | 0 | | | | | | | |
| $I_{16}$ | | | 0 | | | | | 0 | | 0 | | | | | | |
| $I_{17}$ | | | | 0 | | | | | | | 0 | | | | | |

FIG. 12

| ADDRESS | DATA | | ADDRESS | DATA | |
|---|---|---|---|---|---|
| | $O_4$ | $O_3 \sim O_1$ | | $O_4$ | $O_3 \sim O_1$ |
| 0000 (0) | 0 | 010 | 1000 (8) | 0 | 001 |
| 0001 (1) | 1 | A | 1001 (9) | 1 | B |
| 0010 (2) | 0 | 100 | 1010 (10) | 0 | 011 |
| 0011 (3) | 1 | C | 1011 (11) | 1 | D |
| 0100 (4) | 0 | 110 | 1100 (12) | 0 | 101 |
| 0101 (5) | 1 | ERR | 1101 (13) | 1 | E |
| 0110 (6) | 1 | S | 1110 (14) | 1 | ERR |
| 0111 (7) | | | 1111 (15) | | |

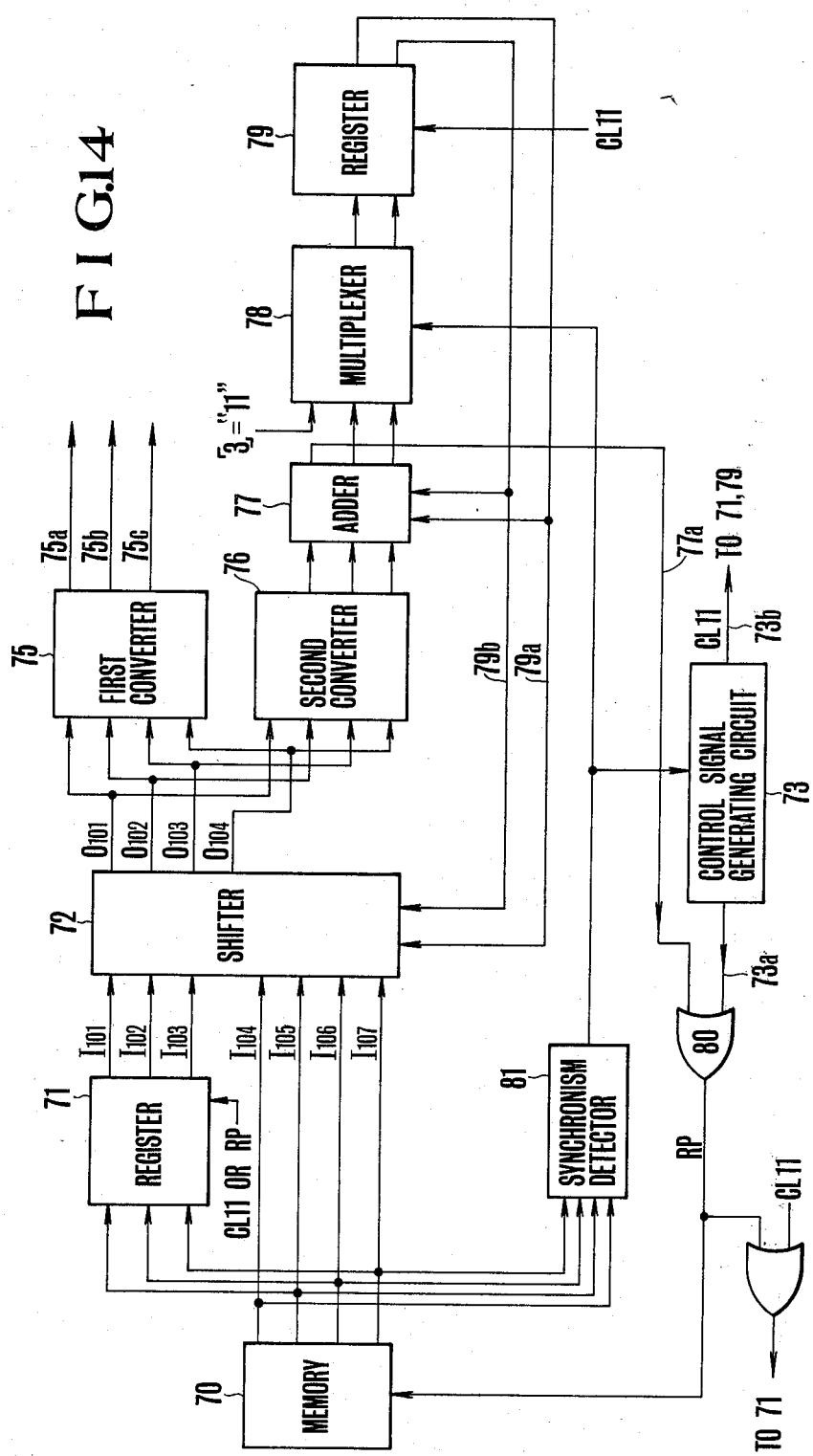

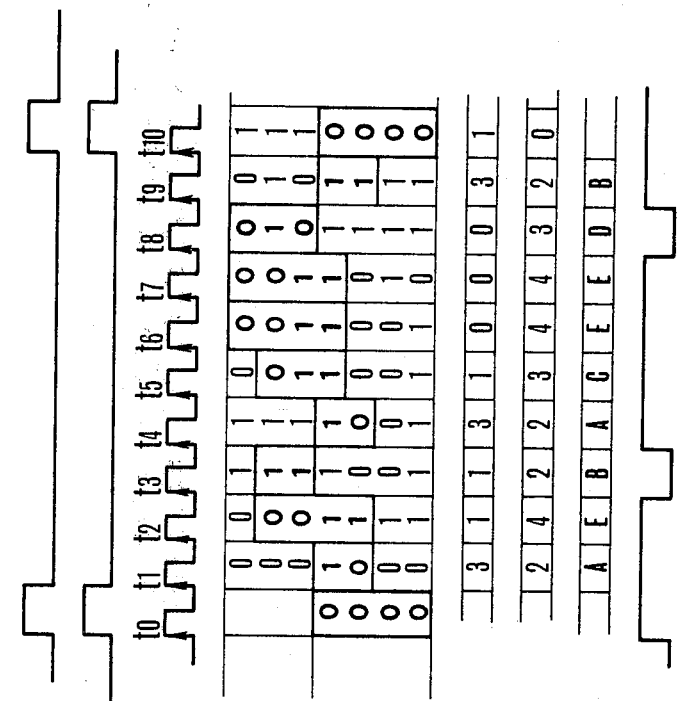

FIG.16

| OUTPUT OF 79 | 00 | | | | 01 | | | | 10 | | | | 11 | | | |
|---|---|---|---|---|---|---|---|---|---|---|---|---|---|---|---|---|
| OUTPUT TERMINAL OF 72<br>INPUT TERMINAL OF 72 | O101 | O102 | O103 | O104 | O101 | O102 | O103 | O104 | O101 | O102 | O103 | O104 | O101 | O102 | O103 | O104 |
| I101 | 0 | | | | | | | | | | | | | | | |
| I102 | | 0 | | | | | | | | | | | | | | |
| I103 | | | 0 | | 0 | | | | | | | | | | | |
| I104 | | | | 0 | | 0 | | | | | | | | | | |
| I105 | | | | | | | 0 | | 0 | | | | | | | |
| I106 | | | | | | | | 0 | | 0 | | | | | | |
| I107 | | | | | | | | | | | 0 | | 0 | | | |

CODE CONVERTING CIRCUITS

BACKGROUND OF THE INVENTION

This invention relates to a code converting circuit and more particularly, a code converting circuit which converts input codes having variable length into parallel N bit data in word units.

For the purpose of improving the efficiency of data compression, various methods of forming codes with variable lengths have been used in apparatus, such as an anticipative encoding apparatus, for compressing such data signal quantities as facsimile signals and television signals to be transmitted. On the transmission side of the compressing apparatus of the type referred to above, the data converted into codes of fixed length are generally sent to a transmission path as serial codes, whereas in the decoding circuit, on the receiving side, the serial codes sent from the encoding circuit are converted into parallel codes for the purpose of increasing the decoding speed. However, since the serial codes sent from the encoding circuit consist of codes having variable length, when the serial codes are converted into parallel codes in the decoding circuit, it is difficult to determine the beginning and the end of each N bits of the fixed length codes. As a result, when such decoding is executed by hardware, the decoding apparatus is quite bulky.

Furthermore, if a device, such as a computer, to which the codes having variable lengths are to be sent, is constructed to input and output the data in terms of word units, it is necessary to rearrange the codes having variable length into parallel codes having word unit length and then send the parallel codes.

SUMMARY OF THE INVENTION

Accordingly, it is the principal object of this invention to provide a code converting circuit that can decode codes of variable length with a relatively simple circuit construction.

Another object of this invention is to provide a code converting circuit applicable to a case wherein the sending device to which the codes having variable length is constructed to input and output the data in terms of word units, such as in a computer.

A further object of this invention is to provide a code converting circuit which can readily determine the beginning and the end of codes having variable length.

A still further object of this invention is to provide a code converting circuit capable of greatly decreasing the overall processing time of a system, such as a computer, connected in a succeeding stage of the code converting circuit.

These and further objects can be accomplished by providing a code converting circuit in which input run length codes are converted to codes having variable length and the variable length codes are converted into a word code train wherein each word comprises N bits, and the converted word code train is used as an output. The code converting circuit consists of means for converting parallel input codes (run length codes of fixed length) into variable length codes, means for generating a specific code having a length equal to at least one word for use as a synchronizing code showing the beginning of a scanning line and the start of a variable length code, means for converting the variable length codes into codes into codes of word unit length (N bits), and means for adding a dummy code so as to complete a word at the end of a scanning line when the end of the variable length codes occurs at an intermediate point of one word. Decoding means for reconstructing the original run length code from the word length codes is also provided. Moreover, a second embodiment is disclosed which uses a parallel processing technique and is particularly adapted for encoding and decoding television video signals.

IN THE DRAWING

FIGS. 9 and 10 are charts showing the manner of connecting input and output terminals in accordance with the control inputs to the first and second shifters shown in FIG. 6;

FIG. 12 shows one example of a code reverse converting table of the converting circuit shown in FIG. 11;

FIG. 14 is a block diagram showing one example of a code converting circuit utilized on the receiving side in combination with the code converting circuits shown in FIGS. 6-10;

FIGS. 15A through 15I are graphs showing the waveforms at various circuit points and the contents of the data useful to explain the operation of the code converting circuit shown in FIG. 14; and FIG. 16 is a chart showing the manner of connecting input and output terminals in accordance with a control input applied to a shifter shown in FIG. 14.

DESCRIPTION OF THE PREFERRED EMBODIMENTS

A preferred embodiment of the code converting circuit of this invention adapted to convert codes having variable length into N parallel bit data is useful for applications in which an original picture is transmitted by using a facsimile device.

Figure 1:
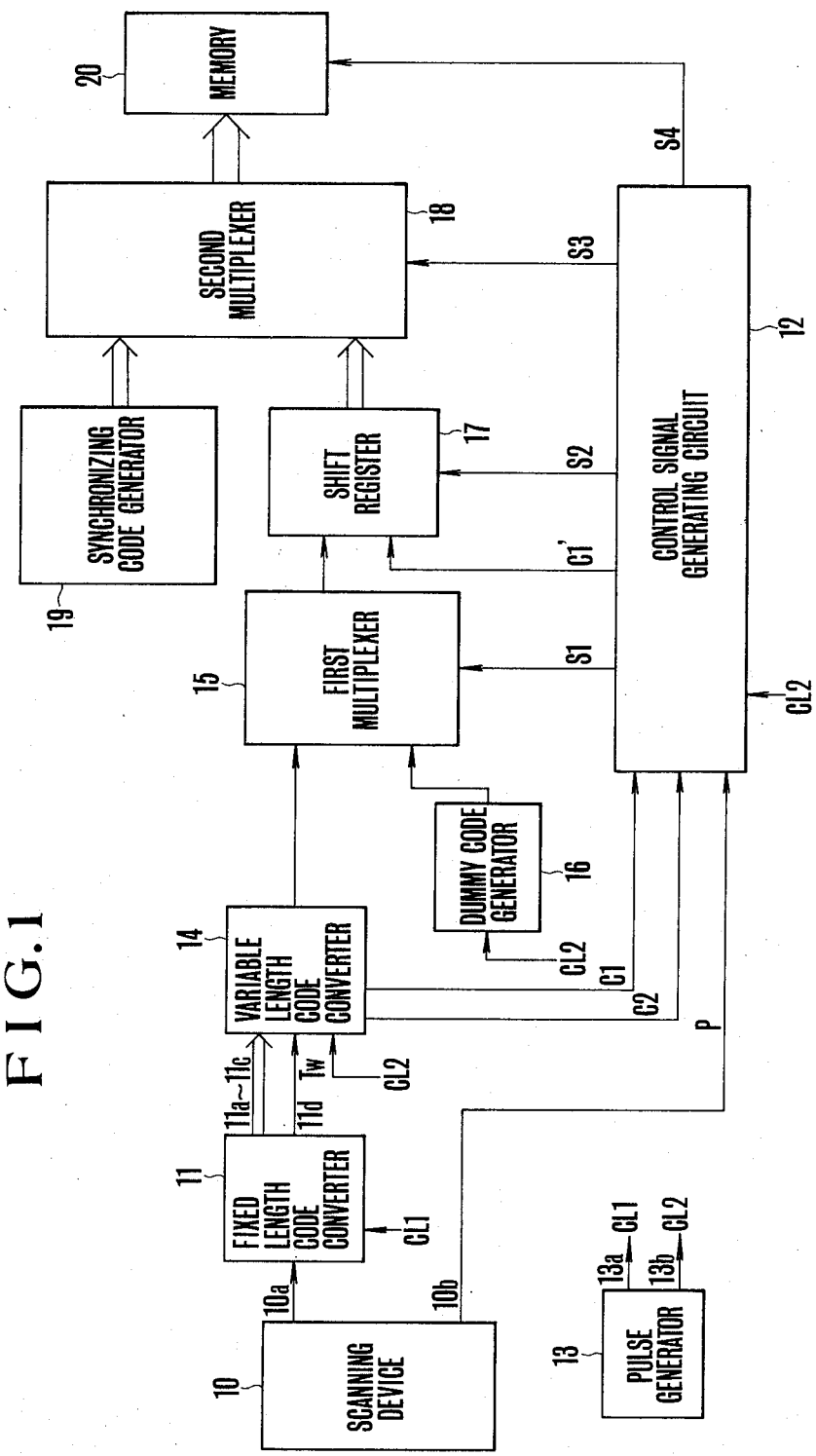
FIG. 1 is a block diagram showing one embodiment of the code converting circuit according to this invention.

In FIG. 1, a scanning device 10 scans an original image in a well known manner to produce a video signal on a line 10a and a phasing or synchronizing signal P on a line 10b. The video signal is sent to a fixed length code converter 11 which samples the video signal with a first clock pulse CL1 sent from a pulse generator 13 over a line 13a. For example, a sampling frequency of 50 kHz, is used to sample the incoming video signal and produce a digital signal in fixed length codes according to a run length method. For example, a white section contained in one scanning line is sampled at the sampling frequency and the number of resulting pulses is counted. When the color changes from white to black, the counted value is parallelly produced as a fixed length, run length code. At the same time, the fixed length code converter 11 produces a timing signal $T_W$. Similar operations are also performed for the transition of a black section to a white section. Thus, the timing signal $T_W$ is produced each time the color changes.

In addition to the clock pulse CL1 having a frequency of 50 kHz and sent over line 13a, the pulse generator 13 produces a second clock pulse CL2 having a frequency of about 1 MHz on a line 13b.

Under the control of the timing signal $T_W$ sent from the fixed length code converter 11 over line 11d, and the clock pulse CL2 sent from the pulse generator 13 over line 13b, a variable length code converter 14 converts the run length encoded signals which are supplied parallelly thereto from the fixed length code converter 11 over lines 11a–11c into serial variable length codes which are sent to a first multiplexer. Further, the variable length code converter 14 sends control signals C1 and C2 to a control signal generating circuit 12. In response to control signals C1 and C2, and the phasing signal generated by scanning device 10, circuit 12 generates control signals S1–S4.

The control signal S1 is used to control the first multiplexer 15 which is supplied with the output of a dummy code generator 16 and the output of the variable length code converter 14 described above. The purpose of the dummy code generator 16 is to make it possible for the code converting circuit to convert an input run length code included in one scanning line of the original picture into variable length codes, then sequentially convert these codes into a series of words each comprising N bits. When the number of the bits of the last word developed by converter 14 is less than N, a dummy code is produced by generator 16 to complete the last word. The first multiplexer 15 operates to apply the output of the variable length code converter 14 to a shift register 17 when the first control signal S1 generated by the control signal generating circuit 12 is a binary "0". However, when the first control signal S1 is a binary "1", the first multiplexer 15 sends the output of the dummy code generator 16, which is generated under the control of the clock pulse CL2, to the shift register 17.

In response to the second control signal S2, which is generated by the control signal generating circuit 12 for each N bits, the shift register 17 converts the output signals of the multiplexer 15 into N bits parallel signals which constitute one word. The outputs of shift register 17 are applied in parallel to a second multiplexer 18 which is also supplied with the output of a synchronizing code generator 19. The synchronizing code generator 19 generates a code (having 4 bits of "0000" in this example) showing the boundary of the run length coded signals with respect to one scanning line. The length of this synchronizing code comprises 4 bits or more. The code can not be prepared in word units from the combination of the fixed length codes regardless of the arrangement.

In response to the third control signal S3 generated by the control signal generating circuit 12, the second multiplexer 18 sends either the output of the shift register 17 or the output of the synchronizing code generator 19 to a succeeding memory device 20. For example, when the control signal S3 is a binary "0", the output of the shift register 17 is sent to the memory device, whereas when the control signal S3 is a binary "1", the output of the synchronzing code generator 19 is sent to the memory device. In response to the fourth control signal S4 from the control signal generating circuit 12, the output of the second multiplexer 18 is read into the memory device 20, which may be a memory device contained in a computer for example, or a buffer memory device.

Figure 2:
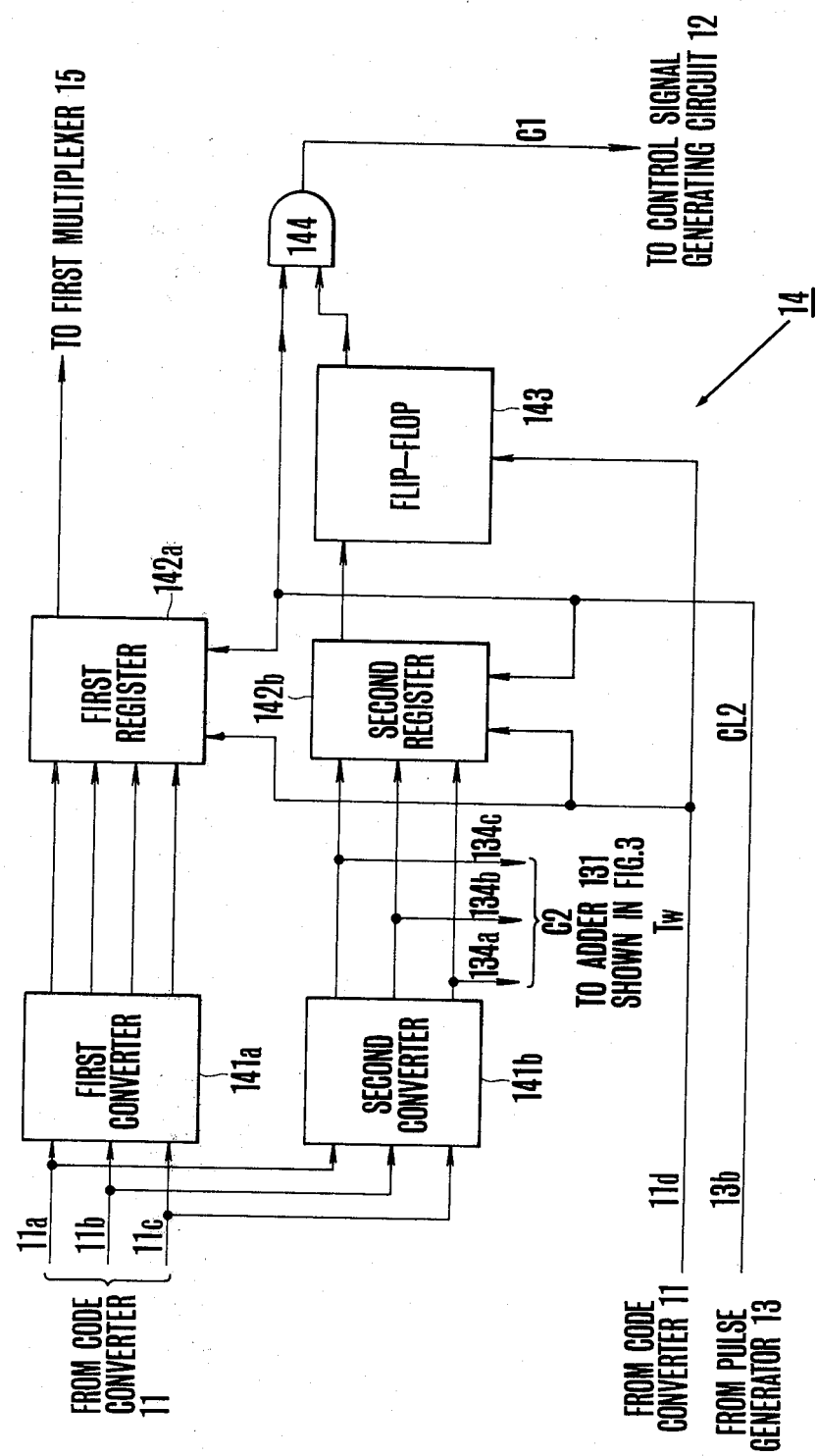
FIG. 2 is a block diagram showing one example of the detail of the circuit for converting codes having variable length shown in FIG. 1.

FIG. 2 shows the detail of the variable length code converter 14 shown in FIG. 1. The outputs of the fixed length code converter 11, which are the equal run length codes of fixed length supplied in parallel through lines 11a–11c, are applied to first and second converters 141a and 141b, for example, which may be read only memory devices (ROM). The first converter 141a contains a code conversion table utilized to convert the received run length codes. Any code conversion mode may be used. For example, where the codes are used frequently, the codes should have a length as short as possible. The second converter 141b contains a code length table utilized to determine the length of the length codes which are obtained by converting the received run length codes. The relationship between the outputs of the first and second converters 141a and 141b for the fixed length run length codes supplied thereto are typically shown in the following Table I.

TABLE I

| fixed length run length codes | converted variable length codes | length of variable length codes |
|---|---|---|
| A | 10 | 2 bits |
| B | 11 | 2 bits |
| C | 011 | 3 bits |
| D | 010 | 3 bits |
| E | 0011 | 4 bits |

In this Table, specific codes are utilized in which the first bits of the converted variable length codes represent the length. However, variable length codes prepared by the well known Huffman technique, or other well known codes, can also be used.

The outputs of the first and second converters 141a and 141b are applied in parallel to first and second registers 142a and 142b. Additionally, the outputs 134a–134c of the second converter 141b are applied to the control signal generating circuit 12. The register 142a functions to convert the parallel inputs into serial outputs. When supplied with the timing pulse $T_W$ from the fixed length code converter 11, through line 11d, the first register is set with the output of the first converter 141a, that is, the fixed length codes are converted into parallel bits. When supplied with a clock pulse CL2 through line 13b, the contents of the first register 142a are serially read out and applied to the first multiplexer 15 in the next stage. Similar to the first register 142a, when supplied with a timing pulse $T_W$ over line 11d, the output of the second converter 141b, that is, parallel bit signals representing the code length, are set in the second register 142b. Each time a clock pulse CL2 is supplied over line 13b to second register 142b, the signals set in the register 142b are sequentially counted down. When the sequence of register 142b becomes zero, the output of register 142b is applied to a flip-flop circuit 143, which, in response to a timing pulse T$_W$ sent over line 11d, produces a set output, but, is reset when supplied with the output of the second register 142b in order to stop its output. The set output of the flip-flop circuit 143 is applied to one input of an AND gate circuit 144. AND gate circuit 144 is enabled by the set output of the flip-flop circuit 143 to pass the clock pulse CL2 supplied over line 13b. The output of the AND gate circuit 144 is applied to the control signal generating circuit 12 to act as a control signal C1 which corresponds to the length of the codes sent to the first multiplexer 15 from the first register 142a.

Figure 3:
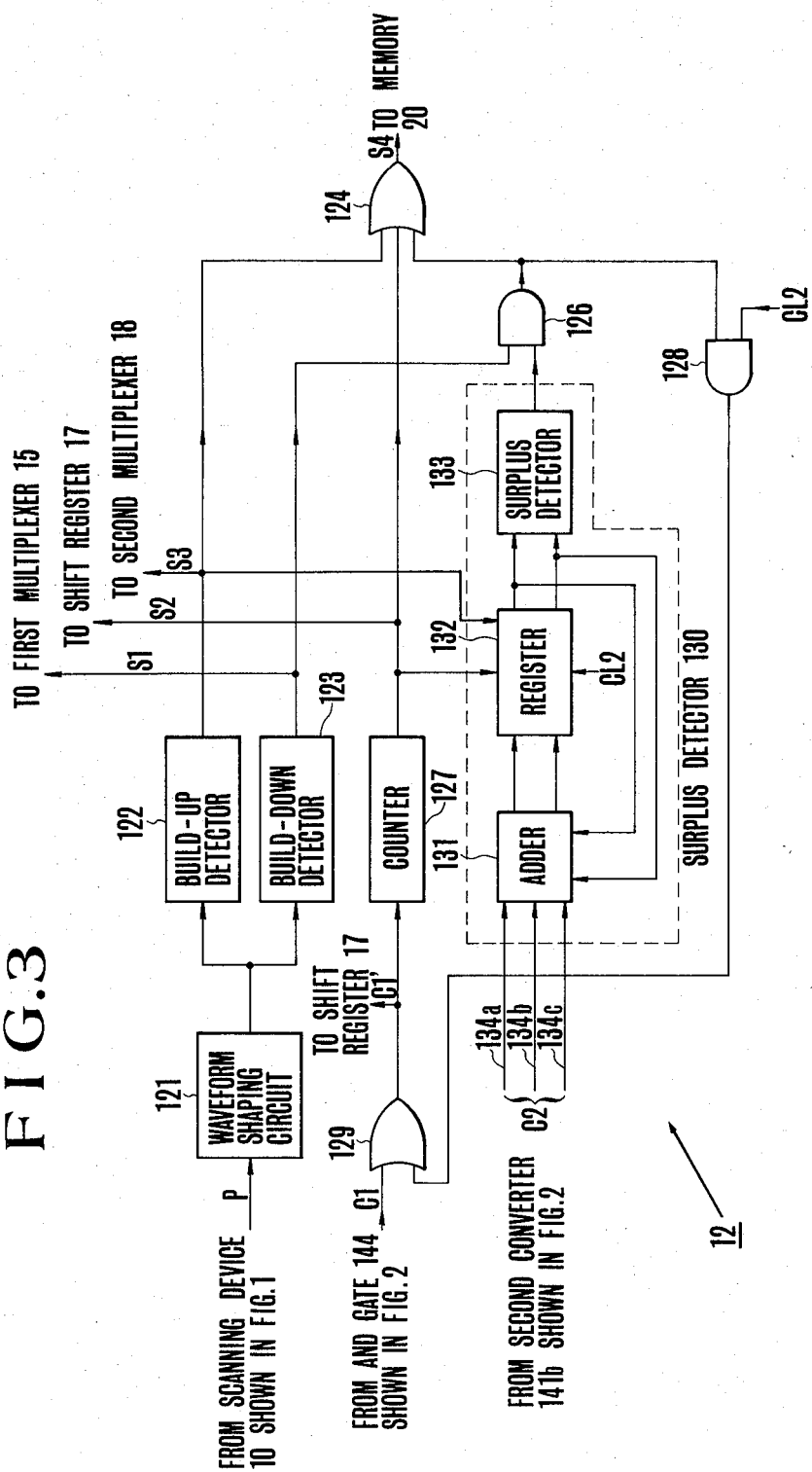
FIG. 3 is a block diagram showing one example of the control signal generating circuit shown in FIG. 1.
Figure 4:
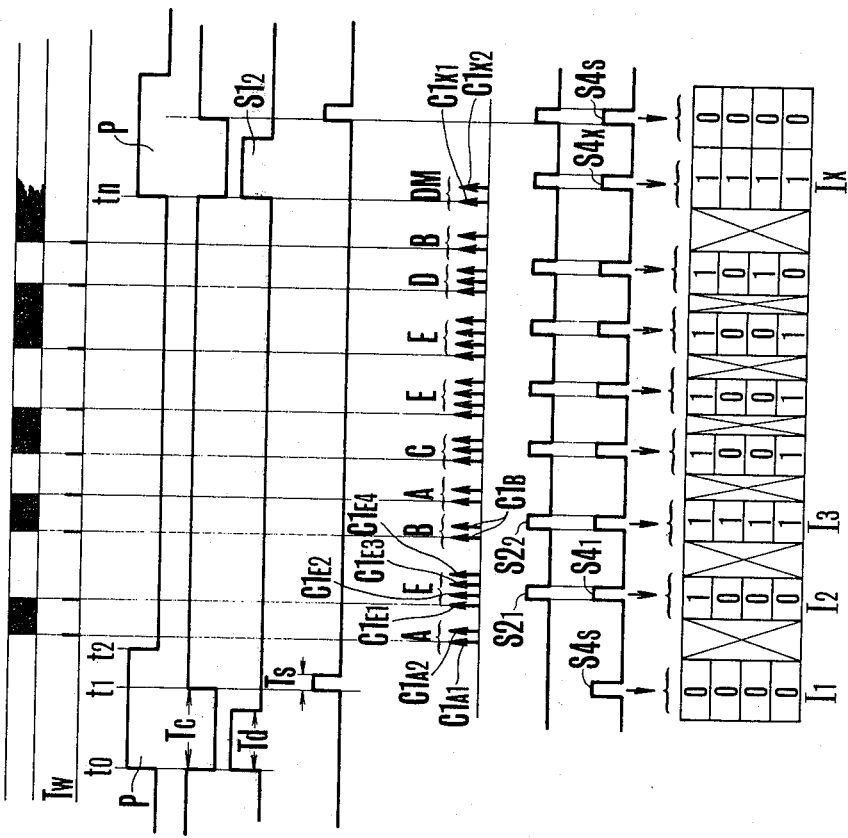
FIGS. 4A through 4J show waveforms and the contents of the data useful in explaining the operation of the circuits shown in FIGS. 1-3.

FIG. 3 shows the detail of the control signal generating circuit 12 shown in FIG. 1. More particularly, the phasing signal P, that is, the synchronizing signal from the scanning device 10 shown in FIG. 1 is applied to a waveform shaping circuit 121 the output of which is applied to a build-up detecting circuit 122 and a build-down detecting circuit 123 which are for example, constituted by one shot circuits. The build-up detecting circuit 122 detects the build-up of the synchronizing signal, and its output is applied to the second multiplexer 18 to act as a third control signal S3, and also to an OR gate circuit 124, and also to the register 132 of a surplus detecting circuit 130 to be described later. The build-down of the synchronizing signal P is detected by a build-down detector 123, the output of which is applied to the first multiplexer 15 to act as the first control signal S1, and also to one input of an AND gate circuit 126.

The control signal C1 sent from the variable length code converter 14, that is, the output of the AND gate circuit 144 (FIG. 2), is supplied to a counter 127 via an OR gate circuit 129. The counter 127 counts the number of control signals C1, and when N bits are counted, the counter 127 produces an output. In this example N is equal to 4. The output of the counter is utilized as a word information code for reconstructing the variable length codes produced by the variable length code converter 14 and is supplied to the shift register 17 as the second control signal S2. The output of counter 127 is also applied to one input of the OR gate circuit 124 and to register 132 in surplus detector 130.

The control signals C2 produced by the variable length code converter 14, that is, the output of the second converter 141b shown in FIG. 2, are applied to surplus detector 130 which acts to determine when a fixed length code from one scanning line terminates at an intermediate point of a word. More specifically, the outputs C2 of the second converter 141b are applied in parallel to an adder 131, and the output thereof is applied to a register 132 to be temporarily stored therein. The content of the register 132 is reset by the output of the build-up detector 122 after storing and sending out the 2 bit output of the adder 131 under the control of the second clock pulse CL2. When reset, the register 132 produces a 0 output, that is "00". This output is sent to the surplus detector 133 and is also fed back to the adder 131 where it is added to the output of the second converter 141b. The number of output lines between the adder 131 and the register 132 is smaller than the number of input lines to the adder 131. Because the purpose of this circuit is to detect the surplus, it is only necessary to detect a number which is less than the number of bits which comprise a word. The surplus detector 133 produces an output except in a case in which the sum of two inputs to the adder 131 is other than N, that is in this case, "100". However, the output of the adder 131 is utilized only when the register 132 produces an output; even when no input is applied to the adder 131 from the second converter 141b. At this time, since the output of the surplus detector 133 and the output of the build-down detector 123 are simultaneously applied to the inputs of the AND gate circuit 126, this AND gate circuit is enabled to apply its output to the OR gate circuit 124 and the AND gate circuit 128.

The output of AND gate circuit 126 indicates that when signals produced by one scanning are converted into codes of word unit length, and when codes of a number insufficient to construct the last word are remaining in the shift register 17, input C1 would not be supplied to counter 127 before it counts up N bits. Accordingly, the output of the AND gate circuit 126 is sent to the AND gate circuit 128 and thence applied to the counter 127 through OR gate circuit 129. At this time, the output of the OR gate circuit 129 is supplied to shift register 17 (FIG. 1) to act as the control signal C1' for storing a dummy signal produced by the dummy signal generator 16, located in the shift register 17.

The operation of the code converting circuit of this invention will be described hereunder with reference to the waveforms shown in FIGS. 4A through 4J. For simplifying the following description, it is assumed that only one scanning line signal is produced by the scanning device.

When the scanning device 10 starts to scan an original picture (not shown), it produces a phase signal, that is, a horizontal synchronizing signal P on line 10b, as is well known in the art. The waveform of this signal is shown in FIG. 4C. When this horizontal synchronizing signal P is sent to the control signal generating circuit 121, this signal is shaped into a waveform shown in FIG. 4D by the waveform shaping circuit 121 shown in FIG. 3. Thus, normally, the waveform shown in FIG. 4D is at a high level but becomes a low level in synchronism with the building up of signal P (at time $t_0$). After elapse of a predetermined interval Tc, the waveform returns to the original high level at time t1.

Upon receiving the output of the waveform shaping circuit 121, the build-down detector 123 produces an output for a definite interval Td as shown in FIG. 4E, in synchronism with the build-down of the output of the waveform shaping circuit 121. The output of the build-down detector 123 is applied to the first multiplexer 15 as the control signal S1, and to the memory circuit 20 via the OR gate circuit 124 to act as the control signal S4. Since this operation is closely related to an important feature of this invention, it will be described later in more detail.

In response to the build-up of the output of the waveform shaping circuit 121, the build-up detector 122 produces an output in synchronism with the build-up as shown in FIG. 4F. This output is applied to the second multiplexer 18 as the control signal S3, and to the memory device 20 through OR gate circuit 124 to act as the control signal S4s shown in FIG. 4I. The output of the build-up detector 122 is also sent to the register 132 of the surplus detector 130. When control signal S4s is produced, the second multiplexer 18 conntects the synchronizing code generator 19 in FIG. 1 to its output for a definite interval $T_s$. Consequently, during interval $T_s$ the second multiplexer 18 sends in parallel a synchronizing signal "0000", shown as I1 in FIG. 4J, to the memory device 20. Thus, the memory device 20 stores this information at the timing of the control signal S4s.

The series of operations described above is performed during an interval t0–t2 in which the synchronizing signal P is being generated. As the generation of the synchronizing signal P terminates, a signal produced by scanning the original picture is sent by the scanning device 10 to line 10a.

When the original picture is scanned once by the scanning device 10, one scanning line image signal (as shown in FIG. 4A) is sent to line 10a (in this example, it is shown as a combination of white and black signals). The image signal sent to the signal line 10a is applied to the fixed length code converter 11 for conversion into run length codes having fixed length. Fixed length run length codes, A, E, B, A, C, E, E, D, and B, in this example, which are obtained by sequentially encoding the color signal obtained by one scanning line, and are produced on lines 11a–11c on the output side of the fixed length code converter 11. A timing signal is also produced as a result of run length encoding appearing on line 11d at a point at which color changes, that is, at a boundary between white and black colors. The waveform of this signal $T_W$ is shown by FIG. 4B. These signals are sent to the variable length code converter 14.

When the fixed length run length codes are sent to the first converter 141a (FIG. 2) of the fixed length code converter 14 over lines 11a–11c, the equal run length codes are converted into variable length codes to the code conversion table contained in the first converter 141a. The resulting fixed length codes are applied to the first register 142a. As shown in the Table described above a code "A" is converted into a binary code "10", code "E" into a binary code "0011" and code "B" into a binary code "11". Concurrently with the code converting operation, the second converter 141b (FIG. 2) prepares a code length signal that determines the bit length of the fixed length code converted by the above described first converter based on the fixed length run length codes applied thereto, and sends the code length signal to the second register 142b and an adder 131 shown in FIG. 3.

In response to the timing signal $T_W$ supplied from the code converter 11, the second register 142b (FIG. 2), is set with the parallel inputs of the code length code sent from the second converter 141b. The content of the second register 142b is counted down in accordance with the second clock pulse CL2 supplied from the pulse generator. When the count is decreased to zero, it sends an output to the flip-flop circuit 143 to reset the same. The flip-flop circuit 143 applies an output to one input of AND gate circuit 144 between the application of the timing signal $T_W$ and the supply of the output from the second register, thus enabling the AND gate circuit 144. Consequently, the AND gate circuit 144 sends the second clock pulse CL2 from the pulse generator 13 to the counter 127 of the control signal generating circuit 12 shown in FIG. 1 to act as the control signal C1. The counter 127 (FIG. 3), counts the number of the control signals C1 and sends an output to the OR gate circuit 124 and to the shift register 17 shown in FIG. 1 each time it counts 4 pulses. The above described control signal C1 is also applied to the register 132 to act as a shift pulse.

In response to the timing signal $T_W$ sent from the fixed length code converter 11, the first register 142a sets the parallel input of the fixed length codes from the first converter 141a in the register 142a. Thereafter, the content of the first register 142a is sequentially read out by the second clock pulse CL2 supplied from the pulse generator 13, and the read out signal is sent to the shift register 17 via the first mulitplexer 15. The shift register 17, (FIG. 1), is sequentially supplied with the fixed length codes at the timing of the second clock pulse CL2. In this case, the shift register 17 has a 4 bit construction so that groups of 4 bits of the fixed length codes are stored therein. The shift register 17 sends out its output under the control of the counter 127 of FIG. 3. Therefore, the shift register 17 of FIG. 1 sends, in parallel, its output to the second multiplexer 18 under the control of the control signal S2, sent from the counter 127, when all of the 4 bits are sorting the codes.

At this time, as shown in FIG. 4F, the control signal S3 is not supplied to the second multiplexer 18 of FIG. 1, the parallel outputs thereof being supplied to the memory device 20 in the succeeding stage. Under the control of the control signal S4s (FIG. 4I) sent from the control signal generating circuit 12, the memory device 20 stores the output of the shift register 17.

The operation of the shift register 17 will be described in more detail with reference to FIGS. 4G–4I. The information first supplied to the shift register 17, after the synchronizing signal P has been sent out, is "10" corresponding to the run length code "A". Accordingly, even after information "10" has been stored in the shift register 17 by control signals C1A1 and C1A2 shown in FIG. 4G, there are vacant or unoccupied spaces to store an additional two bits. Whether such vacant space is available or not is supervised by the counter 127 shown in FIG. 3. At this time, the counter has counted only twice so that control signal S2 is not yet sent out. Consequently, the shift register 17 receives the next information under this state.

The information supplied next time is "0011" corresponding to the run length code "E". In this manner, this information "0011" is written into the shift register 17 by control signals C1E1, C1E2, C1E3 and C1E4 shown in FIG. 4G. At this time, the shift register 17 becomes full when first two bits "00" of the information "0011" are written by the control signals C1E1 and C1E2. At this time, counter 127 of FIG. 3, counts "4" to overflow thus producing a control signal S2 as shown in FIG. 4H. Consequently, when the content of the shift register 17 becomes "1000", the control signal S21 outputs the shift register 17 content 12 shown in FIG. 4J, to the second multiplexer 18. At this time, since the second multiplexer 18 is not supplied with the control signal S3, the output of the shift register 17 is written into the memory device 20 via the second multiplexer 18 at the timing of the control signal S41 shown in FIG. 4I.

The remaining two bits "11" of an information "0011" corresponding to the run length code "E" are written into the register by the control signals C1E3 and C1E4 after the signal has been sent out. At this time, since the count of counter is only 2, the control signal S2 shown in FIG. 4H, would not be sent out.

The information supplied next time is "11" corresponding to the sequence code "B". Thus this information is written into register 17 according to the control signal C1B shown in FIG. 4G. When this information is completely written into register 17, the count of the counter 127 reaches 4, whereby overflow occurs to produce a control signal S22 shown in FIG. 4H. As shown by I3 in FIG. 4J, the content of the shift register 17 at this time is "1111" which is sent to the second multiplexer 18 at the timing of the control signal S22. Thereafter, similar operation is repeated, and when all of 4 bits of the shift register 17 are supplied with an information, it sends an output to the second multiplexer 18 at the timing of the control signal S2.

The last signal processing of one scanning line signals will now be described. More particularly, when an information "11" corresponding to the last run length code "B" of the one line scanning signals is written in the shift register 17, only two bits thereof are written with the information. Consequently, the counter 127 also has a count "2" so that control signal S2 would not be produced. Under these conditions, at time tn as shown by FIG. 4C, a synchronizing pulse P is generated which shows that one scanning has been finished and the next scanning begins, and this synchronizing pulse P is sent to the control signal generating circuit 12. This synchronizing signal P is converted into a negative pulse having a width Tc as shown in FIG. 4D by the waveform shaping circuit 121. In synchronism with the build-down of this negative pulse, the build-down detector 123 sends to the first multiplexer 15 a control signal S12 having a width of Td as shown in FIG. 4E. As a consequence, the state of the first multiplexer 15 of FIG. 1, is switched to connect the dummy code generator 16 to the input of the shift register 17, whereby, the dummy code generator 16 sends a "1" output to the shift register 17 at the timing of the second clock pulse CL2. At this time, the shift register 17 is being supplied with control signals C1' and S2 as follows.

More particularly, the content of register 132 of FIG. 3 of the surplus detecting circuit 130, is reset each time it receives the output of the counter 127. Since the content of the register 132 is fed back to an adder 131 as its one input, the adder adds together its two inputs each time it is supplied with the code length information of the fixed length codes from the second converter 141$b$ shown in FIG. 2. Therefore, only the sum of two lower bits is stored again in the register 132. This means that the shift register 17 is storing incomplete or surplus information. The fact is that "11" corresponding to the fixed length run length code "B", is remaining in the shift register 17, which corresponds to this state. Under these conditions, the surplus detector 133 of FIG. 3 applies its output to one input of OR gate circuit 124 and to one input of AND gate circuit 128. The second clock pulse CL2 from the pulse generator 13 is applied to the other input of AND gate circuit 128 so that upon reception of the output of the AND gate circuit 126, AND gate circuit 128 is enabled to apply the clock pulse CL2 to one input of OR gate circuit 129. Consequently, the output of OR gate circuit 129 is supplied to the shift register 17 as control signals $C1_{x1}$ and $C1_{x2}$ as shown on FIG. 4G, so that the shift register 17 stores the output of the dummy code generator 16 according to these control signals. At the same time, the output of the OR gate circuit 129 is also sent the counter 127. When this counter counts two output pulses of the OR gate circuit 129, the counter overflows to produce a control signal S2. When this control signal is applied to the shift counter 17 the contents thereof become full by storing the information Ix shown in FIG. 4J, that is "1111". Thus, this content is sent to the second multiplexer 18 of FIG. 1, under the control of the control signal S2. The output of the multiplexer 18 is written into the memory device 20 in accordance with the output of OR gate circuit 124 of FIG. 3, corresponding to the output of AND gate circuit 126, which becomes the control signal S4x shown in FIG. 4I. The output of counter 127 resets register 132 thereby disabling the AND gate circuit 126. Accordingly, after the shift register 17 has sent out its contents including a dummy information code, the code converter returns to an empty condition before commencing scanning for the next scanning line.

As can be readily understood, according to this invention, fixed length codes are divided into groups of 4 bits and then the codes are sent to succeeding stages as word units, a specific synchronizing code is inserted at the beginning of each line and a dummy code is attached to the last code of each line to construct the surplus information into a code resembling one word. This makes it easy not only to find out the trailing and leading ends of fixed length codes, but also to encode and decode the information. Moreover, the invention can be readily applied to such apparatus as a computer in which data are applied and produced in word units.

Moreover, since it is not necessary to execute any time consuming special processing, it is possible to greatly reduce the overall processing time of the system from that of the prior art.

Figure 5:
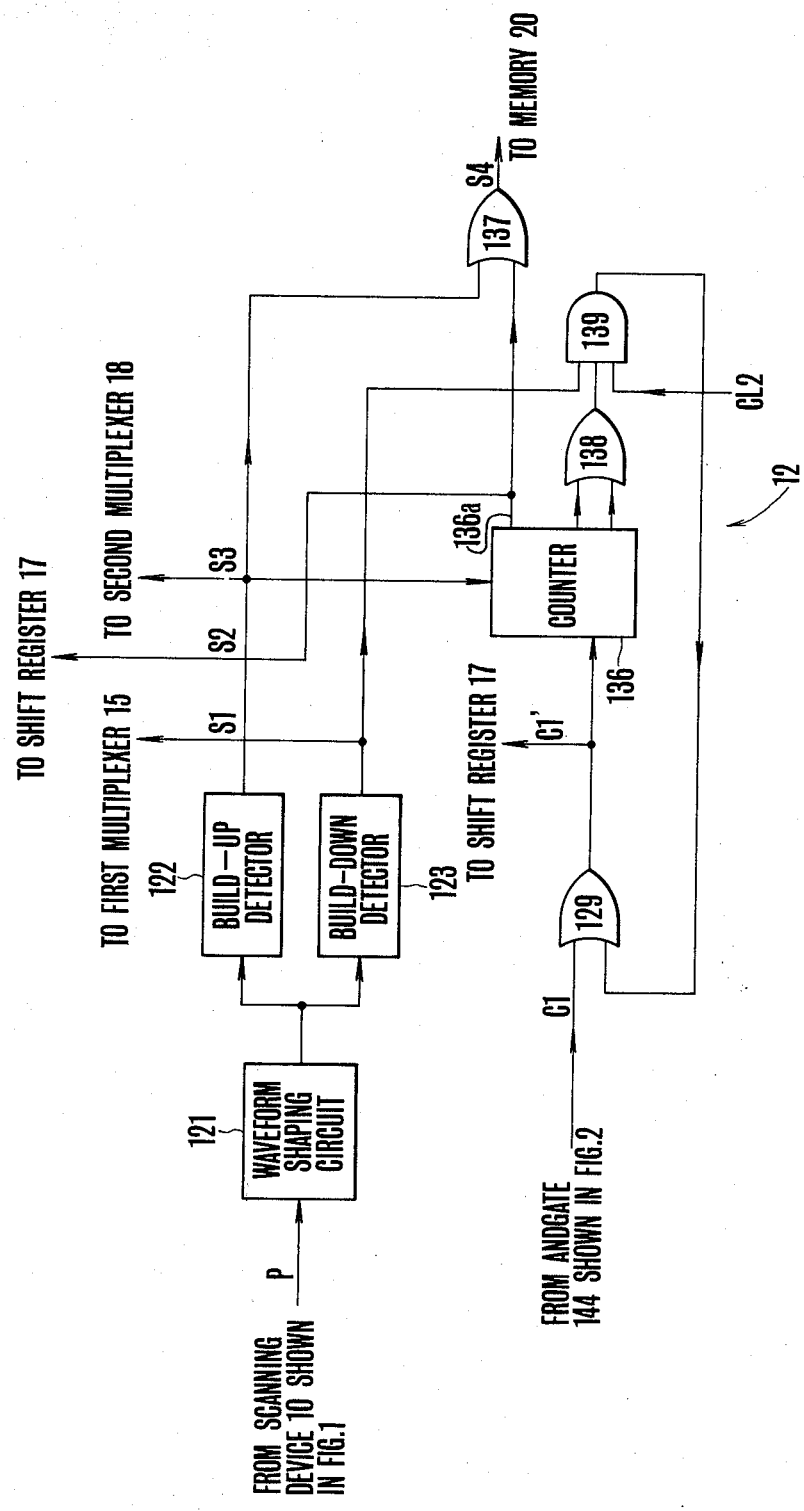
FIG. 5 is a block diagram showing a modification of the control signal generating circuit shown in FIG. 3.

FIG. 5 shows a modification of the system shown in FIG. 3, in which elements corresponding to those shown in FIG. 3 are designated by the same reference characters. The control signal generating circuit 12 shown in FIG. 5 replaces the functional units including a counter 127, a surplus detector 133, a register 132, and an adder 131 similar to those shown in FIG. 3. The control signal C1 supplied to the control signal generating circuit 12 from the AND gate circuit 144 shown in FIG. 2 is supplied to the counter 136 of FIG. 5 via the OR gate circuit 129, and also to the shift register 17 shown in FIG. 1 to act as a control signal (shift pulse C1'). The counter 136 has a 2 bit construction and is reset by the output of the build-up detector 122. The counter 136 sends a control signal S2 on a line 136$a$ each time it counts four control signals which are sent through the OR gate circuit 129. The control signal on line 136$a$ is also sent to one input of OR gate 137. Thus, the control signal is sent out from the OR gate circuit 137 as a control signal S4. It is to be noted that the output of the build-up detector 122 is applied to the other input of OR gate circuit 137. There is also provided an OR gate circuit 138 capable of judging whether or not there is an unoccupied bit remaining in the shift register 17. The unoccupied bit remaining in the shift register 17 occurs when the end of the fixed length code, prepared by driving out the content of the counter 136 by one scanning line, is located at an intermediate point of one word. In other words, the conditions met are whereby the last code information of one scanning line is stored in the shift register 17, with AND gate circuit 139 enabled. AND gate circuit 139 is enabled having inputs connected to receive the output of OR gate circuit 138, the output of the build-down detector 123, and the second clock pulse CL2. The output of AND gate circuit 139 is fed back to one input of OR gate circuit 129.

With this construction, therefore, the counter 136 is reset by the output of the build-up detector 122, which is produced at the start of one scanning line, and then sequentially counts the control signal C1 sent from the AND gate circuit 144 shown in FIG. 2. The counter 136 produces control signals S2 and S4 over line 136$a$ each time it counts four pulses. Consequently, the shift register 17 shown in FIG. 1 sequentially stores its input in accordance with control signal C1′, which is the output of the OR gate circuit 129. Shift register 17 then applies its contents to the second multiplexer 18 in accordance with the control signal S2, which divides the word. While information obtained by one scanning line is being processed, the OR gate circuit 138 produces an output corresponding to the content of counter 136. At this, time, however, since the output of the build-down detector 123, prepared by the synchronizing pulse P, is not applied to the AND gate circuit 139, it remains disabled. When the processing of the information obtained by one scanning line terminates, the build-down circuit 123 sends a control signal S1 to the first multiplexer 15, in accordance the synchronizing signal P. If at this time, a 2 bit information has not been applied to the shift register 17, the count of counter 136 is only "2", thus its output is applied to AND gate circuit 139 via OR gate circuit 138. At this time, since AND gate circuit 139 is supplied with the output of the build-down detector 123, it is enabled to send clock pulse CL2 to OR gate circuit 129. It is to be noted that the control signal C1 is not applied to the OR gate circuit 129. Due to the control signal C1′ of the output of the OR gate circuit 129, the shift register 17 is supplied with the "1" output of the dummy code generator 16. In this example, the shift register 17 stores two "1" inputs. At this time, counter 136 counts the two outputs of the OR gate circuits 129, with the result that the counter 136 counts "4", thus sending control signals S2 and S4. Consequently, the content of the shift register 17 is transferred to the memory device 20 via the second multiplexer 18. After a predetermined interval, the output of the build-down counter 123 would not be applied to the AND gate circuit 139 thus disabling the same. Thereafter, the counter 136 is reset by the output of the build-up detector 122 to prepare it for the processing of the information produced by the next scanning line. With this construction, it is possible to simplify the construction of the control signal generating circuit from that of FIG. 3.

Although in FIG. 5, since the output of the OR gate circuit 129 is applied to the shift register 17 shown in FIG. 1 to act as the shift control signal C1′, the output of the counter 136 on line 136a used as the word transfer control signal S2 may be omitted. Then, while the output of the shift register 17 is sent to the memory device 20, via the first multiplexer 18, the memory device 20 would perform a writing operation with the timing of the control signal S4 so that actual operation would not be disturbed.

Figure 6:
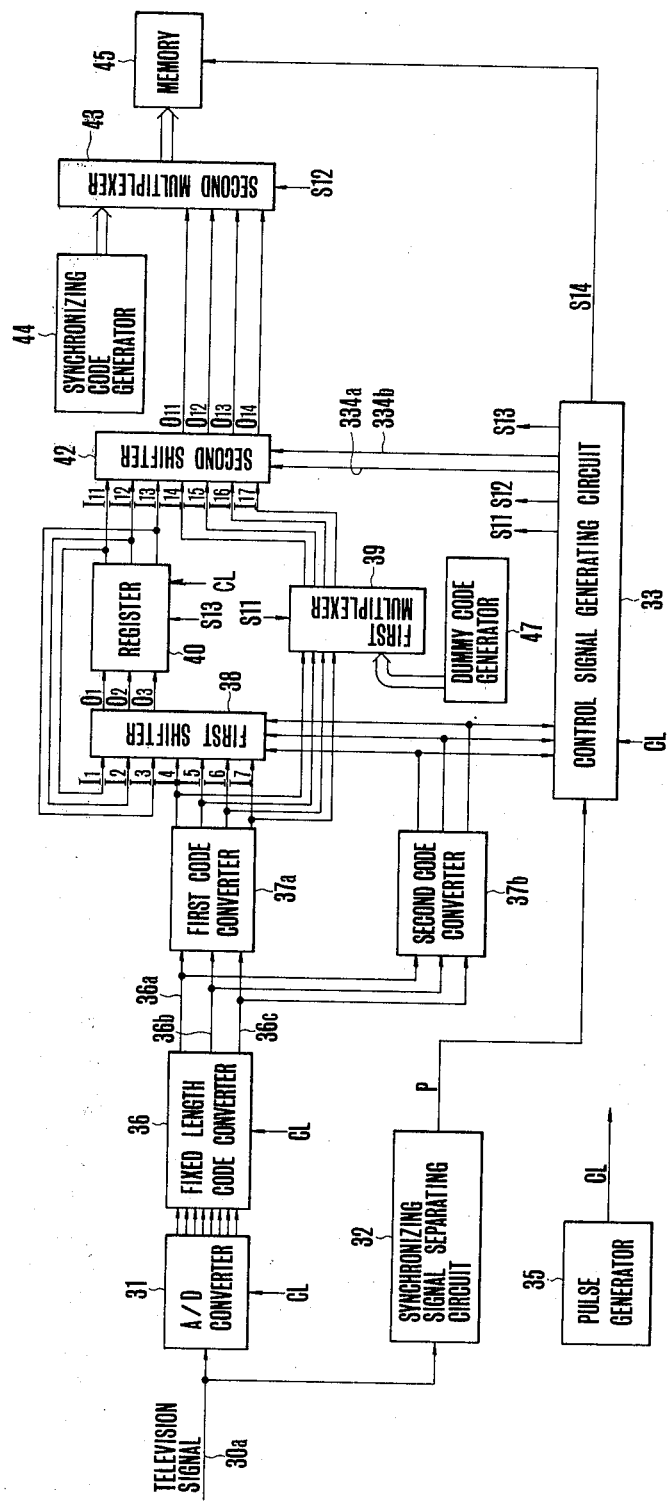
FIG. 6 is a block diagram showing another embodiment of the code converting circuit according to this invention.

FIG. 6 illustrates another embodiment of the code converter according to this invention. More particularly, it shows a code converter of the parallel processing type suitable to encode such signals as video signals of a television system. The video signal input on line 30a includes synchronizing signals and image signals interposed therebetween. The video signals are supplied to an analog-to-digital converter 31 and a synchronizing signal separating circuit 32. The synchronizing signal P from a television signal, having a period of 63 μs as shown in FIG. 8A, is separated from the image signals by the synchronizing signal separating circuit 32, and the synchronizing signal P is then applied to a control signal generating circuit 33 on FIG. 6.

Figure 7:
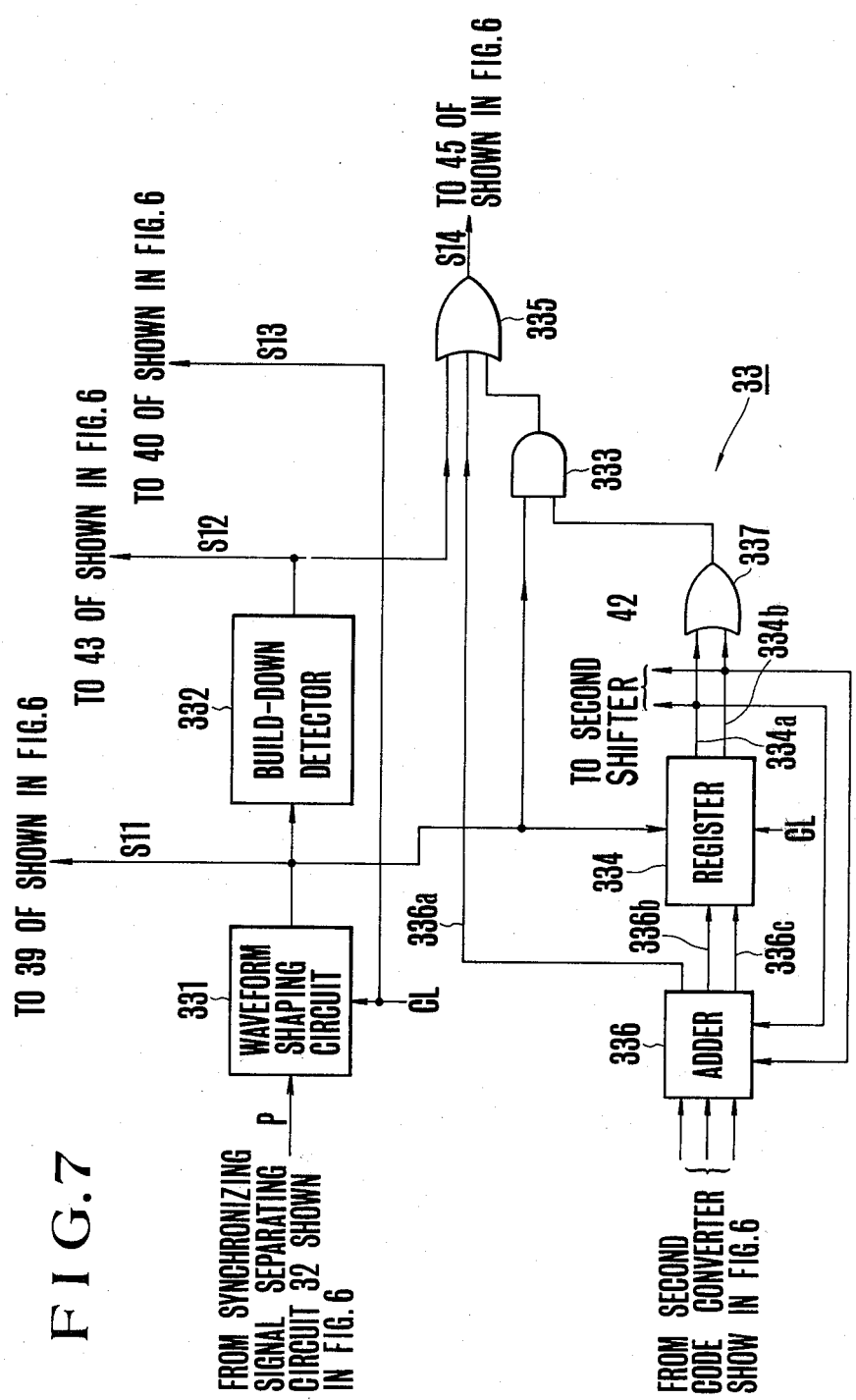
FIG. 7 is a block diagram showing one example of the control signal generating circuit shown in FIG. 6.

The control signal generating circuit 33 is constructed as shown in FIG. 7. The synchronizing signal P, sent from the synchronizing signal separating circuit 32 in FIG. 6, is applied to a waveform shaping circuit 331 where it is shaped in accordance with a clock pulse CL sent from a pulse generator 35 with a frequency of 10 MHz, for example. The output of the waveform shaping circuit is shown by FIG. 8B. This output is applied to a build-down detector 332 which produces an output, as shown in FIG. 8C, and is synchronized with the build-down output of the waveform shaping circuit 331.

The output of the waveform shaping circuit 331, being the control signal S11, is applied to a first multiplexer 39, one input of an AND gate circuit 333, and a register 334. The output of the build-down detector 332, being the control signal S12, is applied to one input of an OR gate circuit 335 and the second multiplexer 43. A clock pulse CL, generated by the pulse generator 35 on FIG. 6, is supplied to registers 40 and 334 as a shift pulse.

The output of the second code converter 37b, shown in FIG. 6, is parallelly applied to an adder 336 which is provided for the purpose of calculating the number of surplus bits. The most significant bit of the output thereof is applied to one input of the OR gate circuit 335 over a line 336a, whereas, the other two bits of the output are applied to the input of register 334. The content of this register is reset by the output of the waveform shaping circuit 331 and receives and produces the output of the adder 336, under the control of the clock pulse CL. The output of register 334 is supplied to the second shifter 42, shown in FIG. 6, to one set of inputs of adder 336, and to the input of OR gate circuit 337 via lines 334a and 334b. The OR gate circuit 337 functions to judge the surplus, and its output is applied to one input of the AND gate circuit 333. When concurrently supplied with the output of the waveform shaping circuit 331 and the output of the OR gate circuit 337, the AND gate circuit 333 is enabled to apply its output to one input of the OR gate circuit 335. When OR gate circuit 335 is supplied with either the output of the build-down detector 332, or the most significant bit of the output of the adder 336 along with the output of the AND gate circuit 333, a control signal S14 is sent to a memory device 45 shown in FIG. 6. Similar to the previous embodiment, this memory device 45 may be a memory device contained in a computer, for example, or a buffer memory device connected to the computer.

The analog-to-digital converter 31 of FIG. 6 performs an A/D conversion of an image signal following a synchronizing signal P of a television signal. More particularly, the A/D converter samples the image signal continued in the television signal. This sampling is accomplished in accordance with a clock pulse CL produced by the pulse generator 35, having a frequency of 10 MHz, for example, to obtain a digital signal, that is a PCM signal. This PCM signal has an 8 bit construction, for example, and is sent to a fixed length code converter 36. This converter performs a predictive coding of the PCM signal sent from the converter 31 into a fixed length code having a smaller number (in this example, 3 bits) of codes than the PCM signal according to the clock pulse CL. Such a coding operation is made by, for example, a differential PCM (DPCM) method or a Frame-to-Frame Differential Coding Method. One example of these methods is disclosed in a paper entitled "TRIDEC System Configuration" by Hideo Kuroda et al, Review of the Electrical Communication Laboratories, Vol. 25, No. 11–12, November–December, 1977. pp. 1347–1351.

The code converter 36 produces fixed length code signals on lines 36a-36c, such fixed length code signals corresponding to codes A, E, B, A . . . utilized in the preceding embodiment. These signals are applied to the first and second code converters 37a and 37b, consisting of ROMs for example. These code converters have the same construction and performance as the code converters 141a and 141b shown in FIG. 2. The first code converter 37a produces in parallel a variable length code corresponding to an input signal as 4 bit outputs. A four bit first converter output includes relevent bits and irrelevent bits, which means that when the irrelevent code is "X" and the input is A, the variable length code is "10" from Table 1 since the relevent bits are two bits and the remaining two bits are irrevelent bits "XX", a four bit output is "10 XX". Similarly, for inputs B, C and D, respectively, outputs of "11 XX", "011X" and "010X" are made. The output for input E is "0011" and there is no irrelevent bit. The irrelevent code "X" can be "1" or "zero". On the other hand, the second code converter 37b, produces in parallel, a code length code corresponding to the length of a fixed length code sent out from the first converter 36 as a bit 3 bit output. The code length code is used in distinguishing the irrelevent bits and the relevent bits.

The output of the first code converter 37a, a variable length code, is applied to the first shifter 38 and the first multiplexer 39. In this example, the first shifter 38 is provided with 7 input terminals I1–I7 and 3 output terminals O1–O3. The connections between the input and output terminals of the first shifter 38 are switched in accordance with the code length signal sent from the second code converter 37b. One example of their connections is shown in FIG. 9 in which the ordinate represents the input terminals of the shifter 38, while the abscissa represents the output terminals for each code length mode. Circles show connections between corresponding input and output terminals.

More particularly, the shifter 38 functions in cooperation with register 40 to be shifted in steps by the output of the second code converter 37b caused by one clock pulse. The register 40 produces the surplus of a preceding variable length code and this output is fed back to the input side of the shifter 38 and used as one of the information code bits to form a surplus information code at the next clock pulse.

The construction of this first shifter 38 is simpler than that of a shift register comprising a combination of a plurality of stages of register. One example of the operation of this first shifter 38 is as follows. If the code length is two bits at the initial state, the output of the second code converter 37b would be "010" so that input terminals I3, I4 and I5 would be connected to output terminals O1, O2 and O3 respectively. Accordingly, the variable length codes appearing at inputs I4 and I5 stored in the register 40 as surplus bits. Where a 3 bit variable length code is supplied, the second code converter 37b produces an output "011" thus interconnecting input terminals I4–I6 and output terminals O1–O3. Accordingly, register 40 stores signals supplied to input terminals I4–I6 among the outputs from the first code converter 37a. As above described, the output of the first shifter 38 is sent to register 40 via output terminals O1, O2 and O3 to store the surplus bits of the code in the register 40.

In response to the control signal S13 the register 40 changes its state and its output is applied parallelly to the input terminals I11–I13 of the second shifter. At the same time, this output is also applied to the input terminals I1–I3 of the first shifter 38 described above. The second shifter is provided with 7 input terminals I1-1–I17 and 4 output terminals O11–O14. It switches the connections between input and output terminals in accordance with an information code regarding the presence or absence of a surplus in the output of register 334 of control signal generating circuit 33, to be described later. This is done so as to add the previous surplus to the present information to form a word information.

FIG. 10 shows one example of the interconnections. Like FIG. 9, the ordinate represents the input terminals while the abscissa represents the output terminals of the shifter 42 for each output mode of the register. In FIG. 10, the circles show connections between corresponding input and output terminals. Consequently, the second shifter 42 combines surplus bits one time slot before they are produced by the register 40. This is accomplished by using the output of the first code converter 37a supplied through the first multiplexer 39 in the present time slot, or, with the output of the dummy code generator 47 to form an output. Suppose now that the surplus bit length equals 2 and that the output of the register 334 (contained in generating circuit 33) is "10", then input terminals I12–I15 and output terminals O1-1–O14 are respectively interconnected. Previous surplus bits, supplied to the input terminals I12 and I13 from register 40, are combined with a portion of the next or new variable length code supplied to the input terminals I14 and I15, and then sent out through output terminals O11–O14.

The output of the second shifter 42 is applied to a second multiplexer 43, which when supplied with a control signal S12 from the control signal generating circuit 33, applies the outputs of the synchronizing code generator 44 to a memory device 45 at the succeeding stage. When it is not supplied with the control signal S12, it sends the output of the second multiplexer 43 to the memory device 45.

The synchronizing code generated by a synchronizing code generator 44 takes the form of "0000", for example. Of course, this code may be of any 4 bit form.

When supplied with the control signal S11 generated by the control signal generating circuit 33, the first multiplexer 39 applies the output of the dummy code generator 47 to the input terminals I14–I17 of the second shifter 42, whereas when it is not supplied with the control signal S11, it supplies the output of the first code converter 37a to the input terminals I14–I17 of the second shifter 42. The dummy code generator 47 produces a code "1111", for example, which is applied in parallel to the first multiplexer 39.

Figure 8:
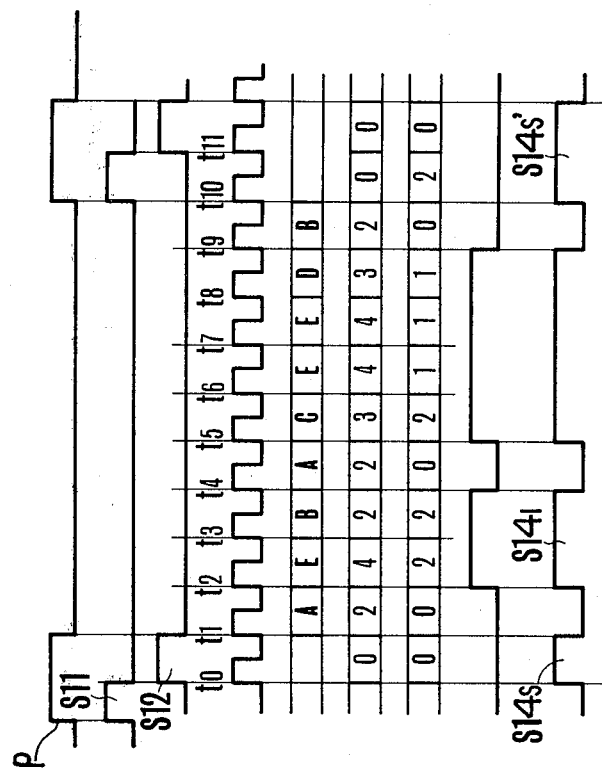
FIGS. 8A through 8I show waveforms at various points and the contents of the data useful in explaining the operation of the circuits shown in FIGS. 6 and 7.

The operation of the system shown in FIG. 6 and 7 will be described hereunder with reference to FIG. 8.

When a television signal is supplied to line 30a shown in FIG. 6, the synchronizing signal separating circuit 32 separates or extracts the synchronizing signal P shown in FIG. 8A. This is sent to the control signal generating circuit 33 so as to produce the control signal S11, FIG. 8B, from the waveform shaping circuit 331 shown in FIG. 7. Note, that the operation of the circuit as provided by this control signal S11 comprises an important feature of this invention, and it will be further described later. At time t0, the build-down detector 332 on FIG. 7 produces the control signal S12 in synchronism with the build-down of the control signal S11 as shown in FIGS. 8B and 8C. Register 334 is set by the control signal S11, while the second multiplexer 43 connects the synchronizing code generator 44 to the memory device 45 so as to supply the output of the synchronizing code generator 44 to the memory device 45. At the same time, the control signal S12 is also applied to one input of the OR gate circuit 335 so that this OR gate circuit outputs the control signal S14 (S14s shown in FIG. 8I) to the memory device 45. The synchronizing code "0000" is stored in the memory device 45 under the control of the control signal S14s. The control signal S12 disappears concurrently with or a little before the termination of the synchronizing signal P. When the control signal S11 disappears, the first multiplexer 39 disconnects the dummy code generator 47 and connects respective output lines of the first code converter 37a to respective input terminals I14–I17 of the second shifter 42.

Then, the sampled image signal, that is the fixed length code contained in one sampled line, is sent to the first and second code converters 37a and 37b at time t1 with a timing synchronous with the clock pulse CL shown in FIG. 8D. It is assumed now that the fixed length codes can be shown by FIG. 8E and that these codes are converted by the code converters 37a and 37b according to the conversion table described above. Thus, the output of the code converter 37b is binary bits having values as shown in FIG. 8F. At time t1, the fixed length code "A", supplied to the first code converter 37a, is converted into a variable length code "10" so that "1" and "0" are applied to the input terminals I4 and I5 respectively. To irrelevent data are applied to the input terminals I6 and I7. At this time, the second code converter 37b produces an output "010" showing that the length of the fixed length code obtained by converting the fixed length code "A" is "2". The output "010" is applied to the first shifter 38 and the adder 336 of the control signal generating circuit 33. According to the connection Table shown in FIG. 9, the first shifter 38 establishes two bit shifter connections between input and output terminals. Thus, input terminals I3, I4 and I5 are connected to output terminals O1, O2 and O3 respectively, while the other input terminals are disconnected from output terminals. Accordingly, the codes "1" and "0" sent from the first code converter 37a to output lines I4 and I5 and are stored respectively in output lines O2 and O3. The output of the register 40 is fed back to the input of the first shifter 38 and is also supplied to the input terminals I12 and I13 of the second shifter 42. The output of the first code converter 37a is also applied to the second shifter 42 via the first multiplexer 39.

The output of the second code converter 37b, that is the code length "010", is also sent to the adder 336 of the control signal generating circuit 33. At this time the output of the register 334 is not applied to the adder 336. Accordingly, the adder produces the code "010" as its output. Thus, no output appears on the line 336a, whereas "1" appears on line 36b and "0" on line 336c. The "10" is written into register 334 with the timing of the clock pulse CL. Code "10" represents a digit 2 and FIG. 8G shows the state of the output of the register 334. Accordingly, the register 334 sends its output to the second shifter 42 and the OR gate circuit 337 via lines 334a and 334b. FIG. 8H shows the output of the OR gate circuit 337. Upon receipt of this output the second shifter 42 switches the connections between input and output terminals according to the Table shown in FIG. 10. In this example, since the output of the register 334 is "10" input terminals I12, I13, I14 and I15 are connected to the output terminals O11, O12, O13 and O14 respectively.

The second shifter 42 sends the signals applied to its input terminals I12-I15 to the memory device 45 via the second multiplexer 43. At this time, however, no input is applied to the OR gate circuit 335, so that the control signal S14 would not be sent and hence the signals would not be stored into the memory device 45.

When a fixed length signal E is supplied to the first and second code coverters 37a and 37b at time t2, the code converter 37a converts this signal into a fixed length code "0011" which is sent to the first and second shifters 38 and 42. The code converter 37b produces a binary code "100" having a value 4 corresponding to the length of this fixed length code. At time t2, the input terminal of the second shifter 42 is supplied with a continuous code "100011" formed by combining the surplus bits "10" sent from register 40 and the fixed length code "0011" sent from the first code converter 37a. Under the control of the control signal "2"(FIG. 8G), sent from the control signal generating circuit 33, as the number of the surplus bits, the second shifter 42 produces outputs "1000" which are sent to the second multiplexer 43. At this time t2, the adder 336 of the control signal generating circuit 33 produces on output lines 336a–336c a sum 6 ("110") of the code length 2 at time t2. In response to signal "1" produced on the output line 336a, the OR gate circuit 335 produces a write pulse S14₁ shown in FIG. 8I. Consequently, the output "1000" sent to the second multiplexer 43 is stored in the memory device 45. The signal "10" applied to the output lines 336b and 336c of adder 336 is written into the register 334 by the next clock pulse CL. As can be noted from FIG. 8, since the content of the register 334 is "10" (2), this OR gate circuit 337 continues to produce an output. At this time, however, since the output of the waveform shaping circuit 331 is not supplied to the AND gate circuit 333, this output is not sent to the OR gate circuit 335. Thereafter, this operation is performed between t3 and t8 in which the first shifter 38 forms the surplus bits and temporarily stores them in register 40, whereas the second shifter 42 produces a signal in word units of 4 bits, except, a number of bits corresponding to the number of the surplus bits calculated by the register 334 of the control circuit 33.

At time, t9, operations similar to the above description are performed, but it should be noted that the fixed length code B, sent from the code converter 36 at this time, is the last one of the image signals in one line to be processed. When this signal is coded by the first code converter 37a and sent to the first shifter 38, the resulting surplus code is "11", thus applying "1" to each of the output terminals O2 and O3 of the first shifter. Since at this time, the number of the surplus bits is 2, register 334 produces "10" (see FIG. 8G). Accordingly, the input terminals I13-I16 of the second shifter 42 are connected to output terminals O11-O14 respectively.

Under these conditions, at time t10 the synchronizing signal separating circuit 32 produces a synchronizing signal P, shown in FIG. 8A, which is sent to the waveform shaping circuit 331, of the control signal generating circuit 33, to produce a control signal S11. As a consequence, the first multiplexer 39 connects the dummy code generator 47 to the second shifter 42 to supply a dummy code "1111" to the input terminals I14-I17. Consequently, the second shifter 42 supplies the surplus two bit output from the register 40 and two of the 4 bits of the dummy code to the memory device 45 via the multiplexer 43. The remaining bits of the dummy code are discarded. At this time, control signal S12 from the output of the build-down detector 332, which is generated at the build-down portion of signal S11 at time t11 is applied to the OR gate circuit 335. OR gate circuit 335 is enabled to send out a control signal S14s' as shown in FIG. 8I, which is used to store the output of the multiplexer 43 in the memory device 45.

Thereafter, the image signal of the next line is processed in the same manner.

It should be understood that the invention is not limited to the specific embodiments described above and that many changes and applications are obvious to one skilled in the art. For example, although in the embodiment shown in FIGS. 1 through 5 a synchronizing code was added to each fixed length code of one scannine line, the synchronizing signal may be inserted at each scanning. Furthermore, the synchronizing codes may be interposed between frames.

When the serial processing system shown in FIG. 1 is used it is necessary to use ultra high speed processing elements. However, the use of such elements results in large physical size and higher at cost. On the other hand, the parallel processing system shown in FIG. 6 is not subject to such disadvantages.

Figure 11:
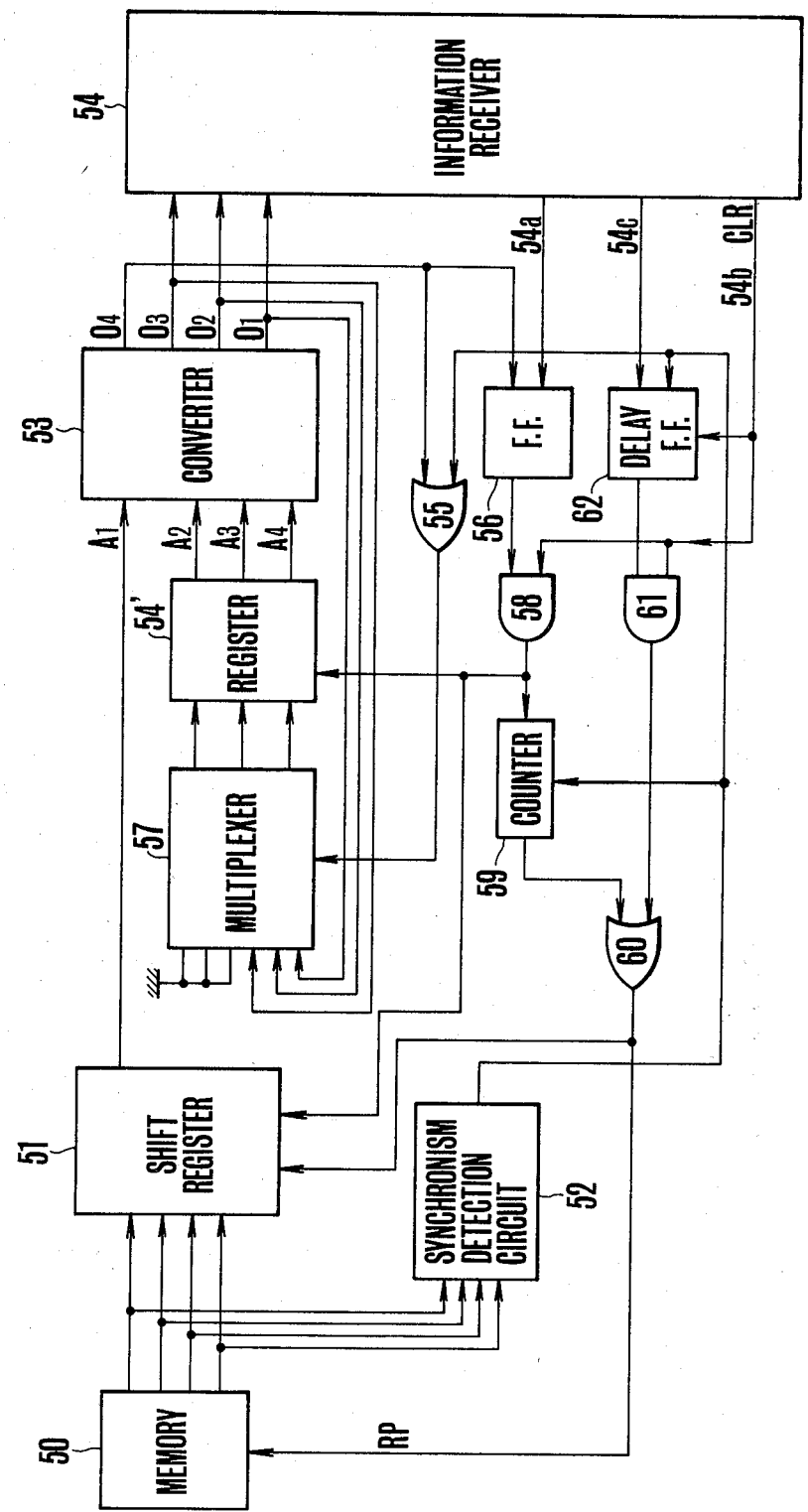
FIG. 11 is a block diagram showing one example of a code converting circuit utilized on the receiving side in combination with the code converting circuits shown in FIGS. 1 through 5.

FIG. 11 shows one example of a code converter on the receiving side which is used in combination with the code conerters shown in FIGS. 1-5 and makes the structure simpler than that of prior circuits. The operation of the code converter on the receiving side is just opposite to that on the transmitting side. Thus, data encoded into fixed length codes are read out in parallel from the memory device in N bits, and the read out code is decoded into an original information train.

More particularly, a memory device 50 may be the memory device 20 shown in FIG. 1; or a memory device 50 could receive the output from the memory device 20 over a transmission line. The content of the memory device 50 is sent in parallel to a shift register 51 and a synchronism detection circuit 52 each time a read out pulse RP is supplied. The shift register 51 functions to convert parallel inputs into serial data which are serially sent to a converter 53, which is connected to receive the output of the shift register 51 as the most significant bit. The outputs of the register 54' act as the lower three bits following the most significant bit. The converter 53, which may consist of a ROM for example, contains a code reverse conversion table which produces, on output terminals O4-O1, predetermined codes having a fixed length in accordance with the input signal described above, that is, an address information. One example of this table is shown in FIG. 12. The output or data appearing on the terminals O3-O1 of the converter 53, are sent to an information receiver such as a facsimile device. The output of the terminal O4 is applied to an OR gate circuit 55 and the reset input of the flip-flop circuit 56.

The OR gate circuit 55 is also supplied with the output of the synchronism detection circuit 52 in order to supply a control signal to a multiplexer 57. Under the control of this signal, the multiplexer 57 supplies to a register 54' a ground signal or the outputs O3-O1 of the converter 53. More particularly, when supplied with the output of the OR gate circuit 55, the multiplexer 57 sends a ground signal "000" to register 54', whereas, when the output of the OR gate circuit 55 is not applied, it applies the lower three bits of the output of the converter 53 to register 54'.

The flip-flop circuit 56 is set by a run length code request timing pulse supplied thereto from the information receiver 54 over a line 54a, and reset by the most significant bit O4 of the output of the converter 53. This set signal is applied to an AND gate circuit 58, together with a clock pulse CLR sent from the information receiver 54 over a line 54b. Consequently, the AND gate circuit 58 is enabled to supply the clock pulse CLR to a counter 59, shift register 51, and register 54 to act as a shift pulse. The counter 59 has a 4 bit construction, so that each time it counts four clock pulses it sends an output to an OR gate circuit 60. The counter 59 is reset by the output of the synchronism detection circuit 52. The output of the OR gate circuit 60 is applied to the memory device 50 to act as a read out pulse RP, and to the shift register 51 to act as a shift pulse. Also the output of the AND gate circuit 61 is applied to the OR gate circuit 60. When supplied with the output of a delay flip-flop circuit 62, the AND gate circuit 61 applies the clock pulse CLR, supplied over line 54b, to one input of OR gate circuit 60. Consequently, the output of this AND gate circuit 61 is utilized as the read out pulse RP, and as the shift pulse of the shift register 51. The delay flip-flop circuit 62 is reset by a horizontal synchronizing pulse supplied from the information receiver 54 over line 54c, under the control of the clock pulse CLR supplied through line 54b, and is reset by the output of the synchronism detection circuit 52.

Figure 13A:
FIGS. 13A through 13E are graphs showing the waveforms at various points and the contents of the data useful in explaining the operation of the code converting circuit shown in FIG. 11.
Figure 13B:
Figure 13C:

The operation of the circuit shown in FIGS. 11 and 12 will now be described with reference to FIG. 13. At first, a synchronizing pulse shown in FIG. 13A is sent to the delay flip-flop circuit 62 from the information receiver 54 over line 54c. This sets the flip-flop circuit under the control of the clock pulse CLR. The output of the delay flip-flop circuit 62 is sent to AND gate circuit 61, which is enabled, when it receives the clock pulse CLR from the information receiver 54 over line 54b, to apply its output to the OR gate circuit 60. The output of the OR circuit 60 is applied to the memory device 50 to act as the read out pulse RP (see FIG. 13E), and also to the shift register 51 to act as a shift pulse.

In response to the read out pulse, the memory device 50 sends an information code (data) firstly written therein to the shift register 51 and the synchronism detection circuit 52. The data sent out first in a synchronizing signal "0000". This signal is detected by the detection circuit 52 and its output is sent to delay flip-flop circuit 62, OR gate circuit 55, and counter 59. As above described, since the flip-flop circuit 62 is of the delay type, it holds the previous state until the next new data is read out from the memory device 50, and then resets. The counter 59 is reset by the output of the synchronism detection circuit 52. When supplied with the output of the synchronism detection circuit, the OR gate circuit 55 applies a control signal to the multiplexer 57, causing it to produce a ground signal on the output line.

A timing pulse (FIG. 13B) is applied to the flip-flop circuit 56 from the information receiver 54 through line 54a, thus setting the flip-flop circuit 56 to send an output to the AND gate circuit 58. Consequently, the AND gate circuit 58 sends a serial shift clock pulse, shown in FIG. 13D, to register 54' and counter 59. In response to this shift clock pulse, the shift register 51 applies to an address line A1 of the code converter 53 the respective bits of the data which are arranged in 4 bit word units and encoded into fixed length codes. The ground signal, that is, a code "000", is supplied to other address lines A2-A4 of the code converter 53 which designates the addresses of lower 3 bits, via multiplexer 57 and the register 54'. The first bit of the data supplied to the code converter 53 via the shift register 51, is "1" as shown by I2 in FIG. 4J. This data is supplied to an address line A1 representing 2 digits. Consequently, the address information of the code converter 53 becomes "1000" which means address "8". Consequently, the code converter 53 reads out the data content corresponding to the address 8 according to the table shown in FIG. 12. Thus, "0" is produced on an output line O4 representing the most significant bit, and "001" representing 1, is produced on lines for the lower three bits. When the next clock pulse is suppled from the AND gate circuit 58, the lower three bits of the data is applied to the converter 53, that is, address line A2-A4, via the multiplexer 57 and the register 54'. As shown by I2 in FIG. 4J, the data of the second data supplied from the memory device 50 at this time is "0". Accordingly, "0001" is supplied to the address line of the code converter 53 designating address 1. Accordingly, the code converter 53 applies "1" to terminal O4 and a run length code A (FIG. 13C) to terminals O3-O1, according to the conversion table shown in FIG. 12. This code A is sent to the information receiver 54. The fact that the terminal O4 becomes "1" means that the decoding operation has been completed, and this signal is sent to the flip-flop circuit 56 to reset same, thus preventing the AND gate circuit 58 from supplying a shift pulse thereafter. The "1" output on terminal O4 is also sent to the multiplexer. The ground signal is sent again to register 54, thus preparing for the decoding of the next data.

As above described, for each time a new run length code request timing pulse is sent from the information receiver 54 through line 54a, the fixed length codes are sequentially decoded. Each time the counter 59 counts 4 bits of the serial shift clock pulses, the counter overflows to send its output to the OR gate circuit 60 for forming a read out pulse RP and for reading out data from the memory device 50. New 4 bit data is read out from the memory device by the read out pulse and the read out data is applied to the shift register 51.

Figure 13D:
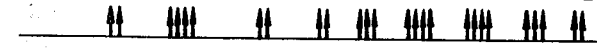
Figure 13E:

When the run length codes A, E . . . are decoded at a timing shown in FIG. 13D and as the last code B of one scanning line is decoded, a synchronizing code is read out by the next synchronizing pulse (FIG. 13A). The dummy code which was added on the transmission side is read out at this time and discarded. The symbol "ERR" in a column O3-O1 in the table shown in FIG. 12, shows arrival of a fixed length code not prescribed on the transmission side, and on the receiving side such state is judged as an error.

FIG. 14 shows one embodiment of a code converter which is used on the receiving side in combination with the code converter shown in FIGS. 6 through 10. More particularly, the code converter shown in FIG. 14 comprises a parallel type code reverse converter corresponding to the parallel type code converter shown in FIGS. 6 through 10. Data converted into variable length codes are read out from a memory device 70 as parallel N bits and the read out codes are decoded into the original information train.

In FIG. 14, the memory device 70 may be the same as the memory device shown in FIG. 6, or a buffer memory device connected to receive the output of the memory device 45 through a transmission line. The content of the memory device 70 is shown by FIG. 15E.

Each time a read out pulse RP is applied, the memory device 70 supplies parallelly its contents to the input terminals of the register 71 and the input terminals I104-I107 of the shifter 72. When supplied with the clock pulse CL11, generated by the control signal generating circuit 73, or with the read out pulse RP, the register 71 stores the output of the memory device 70. The content stored in register 71 is shown by FIG. 15D, and the output of the register 71 is applied to the input terminals I101-I103 of the shifter 72, which is controlled by the output of the register 79, through control wires 79b and 79a.

FIG. 16 is a table showing the connections between the input and output terminals established by the output of register 79. For example, when a signal "00" is applied to the control line, that is, at the time of zero shift, input terminals I101, I102, I103 and I104 are connected to output terminals O101, O102, O103 and O104 respectively. As the signal supplied to control lines 79b and 79a varies to "01", "10" and "11", the connections between the input terminals connected and the output terminals O101-O104 are shifted one bit from the connections of zero shift. It should be noted that a controlled signal is produced such that the first bit of 4 bit output of the shifter 72 always becomes the beginning of the variable length codes.

The first and second code converters 75 and 76 parallelly receive the output of the shifter 72. The first code converter 75 contains a conversion table that converts variable length codes into fixed length codes A-E. The codes A-E (see FIG. 15H) produced by the converter 75 are supplied to outside through signal lines 75a, 75b and 75c.

The second code converter 76 contains a conversion table which produces the length of the variable length codes according to the output of the shifter 72. Its output is sent out in the form of binary codes corresponding to the numeral representing the code length as shown in FIG. 15G. The 3 bit output of the second code converter 76 is applied in parallel to an adder 77, and the lower two bits of the output thereof, are stored in the register 79 via multiplexer 78. The output of register 79 is applied to the other input of the adder 77. An output of the adder 77 having the most significant bit, that represents that the result of addition is large than 4, is supplied to an OR gate circuit 80 via line 77a. The multiplexer 78 is connected to receive the output of a synchronism detection circuit 81 which extracts a synchronizing signal (FIG. 15B) in response to the output of the memory device 70. The synchronism detection circuit 80 produces the synchronizing signal when all 4 bit inputs supplied from the memory device 70 are zero. The synchronizing signal is sent to the control signal generating circuit 73 which, in response to this signal, sends a pulse showing the beginning of one scanning line to line 73b.

The operation of the circuits shown in FIGS. 14-16 will now be described. A pulse shown in FIG. 15 is generated by the control signal generating circuit 73 at time to for the purpose of determining the initial condition. The pulse is sent to OR gate circuit 80 over line 73a for sending a read out pulse shown in FIG. 15I to the memory device 70. As a consequence, the data read out first from the memory device 70, is a sychronizing signal "0000" which is detected by the synchronism detection circuit 81 and then sent to the multiplexer 78. In response to this signal, the multiplexer 78 selects the initial state side to send a signal "11" representing digit 3 to the register 79. Signal "11" is delayed one clock length by register 79 and then sent to shifter 72 over control lines 79a and 79b at time t1.

When supplied with this signal "11", the shifter 72 judges that the number of shifts is 3 and connects input terminals I104–I107 to output terminals O101–O104 respectively. Under these conditions, the next data "1000" is supplied to the shifter 72 from memory device 70. At this time, by the connections described above, a signal "1000" appears on the output side of shifter 72. Consequently, the first code converter 75 judges, according to the table contained therein, that the upper two bits "10" are variable length codes representing information A, thus producing fixed length codes of information A on lines 75a–75c. At this time, the second code converter 76 supplies to adder 77 an output "010", showing that the code length is 2 according to the conversion table contained therein. Adder 77 adds together the code length 2 and the output of the register 79, that is, the number of shifts 3, to obtain a binary output having a value of 5. This digit 5 means that the upper 5 bits of the input to the shifter 72 are old codes that have already been decoded, and that not yet decoded new codes are the sixth and seventh bits, that is, signals applied to input terminals I106 and I107. Thus, in order to decode a variable length code whose maximum code length is represented by 4 bits, it is necessary to supply new data. In other words, when the output of adder 77 is larger than 4, a signal requesting read out of data is applied to OR gate circuit 80 over line 77a. As a consequence, the OR gate circuit 80 supplies a read out pulse RP to the memory device 70 thus reading the next data. As above described when the output of the adder 77 is larger than 4 it is necessary to substract 4 from the sum 5 to obtain 1 which represents the number of the next shift. This logic can be executed by supplying the lower two bits of the output of the adder 77, that is "01", to register 79 via multiplexer 78.

At time t2, a new data is supplied to shifter 72 from the memory device 70, and old data containing the not yet decoded two bits is supplied to the input terminals I101–I103 of the shifter 72, from register 71. Since the number of shifts at this time is one, signal "0011" is produced at the output terminals O101–O104 of the shifter 72.

In FIGS. 15D and 15E are variable length codes which are decoded by the output of the shifter are indicated by thick lines. In this manner, the codes are sequentially decoded.

At time t9, the last information B is decoded. Although at this time, not yet decoded 2 bit code "11" is remaining, since then synchronizing code "0000" is detected at time t10, the code is identified to be a dummy code.

What is claimed is:

1. A code converting circuit wherein an input signal is converted into a word code train, each word thereof comprising N bits, said code converting circuit comprising:
   means for generating parallel variable length codes corresponding to said input signal;
   means for generating a code length code regarding the length of said variable length codes;
   a first shifter controlled by the code length signal for switching the connection between input and output terminals to produce a surplus of one word;
   a register connected to temporarily store the output of said shifter, means for feeding back the output of said register to the input of said first shifter;
   a dummy code generating means for generating parallel dummy codes;
   a first multiplexer for selecting either one of said parallel variable length codes and said parallel dummy codes;
   a second shifter connected to receive the output of said first multiplexer and the output of said register to form a code of word unit length;
   means for parallelly generating a specific code having a length of at least one word and utilized as a synchronizing code;
   a second multiplexer for selecting either one of said synchronizing code and the output of said second shifter; and
   a control means for causing said second multiplexer to produce said synchronizing code before producing said variable length codes of word unit length and for controlling said second shifter to produce said variable length codes in word unit length in accordance with a control signal regarding the length of said surplus, when said variable length codes terminate at an intermediate point of one word, said control means controlling said first multiplexer to send said dummy signal to said second shifter.

2. A code converting circuit according to claim 1 which further comprises:
   a register connected to receive the output of said second multiplexer;
   a third shifter connected to receive the output of said register and the output of said second multiplexer;
   means for separating a synchronizing signal from the output of said second multiplexer;
   a converter responsive to the output of said third shifter for effecting reverse conversion to an input signal; and
   means responsive to the output of said third shifter and said synchronizing signal for controlling the connection between the input and the output of said third shifter.

3. A code converting circuit wherein an input signal is converted into a word code train, each word thereof comprising N bits, said code converting circuit comprising:
   means for generating serial variable length codes corresponding to said input signal;
   a dummy code generating circuit for generating serial dummy codes;
   a first multiplexer for selecting either one of said serial variable length codes and said serial dummy codes;
   a shift register responsive to the output of said first multiplexer for converting said output into a code of word unit length and then parallelly producing said code;
   means for parallelly producing a specific code having a length of at least one word length and acting as a synchronizing code;
   a second multiplexer for selecting either the output of said shift register or said synchronizing code;
   control means for controlling the second multiplexer to produce said synchronizing code before sending out said variable length code and for counting the lengths of said serial variable length codes thereby causing said shift register to produce an output of word unit length for each one word, said control means controlling said first multiplexer so as to supply said dummy code to said shift register when said variable length codes terminate at an intermediate point of one word;

a shift register which converts the parallel outputs of said second multiplexer into serial signals;

means for reversely converting the output of said shift register into a code corresponding to an input signal;

means for separating a synchronizing signal from the output of said second multiplexer; and means responsive to the synchronizing signal and the output of said reversely converting means for controlling an input to said reversely converting means.

4. In an information communication system including information scanning means, encoding means, transmitting means, receiving means, decoding means and reproduction means, an improved encoding means comprising:

run length encoder means for converting input analog signals corresponding to scanned lines of communicative information into digital run length codes and for generating synchronizing signals indicating the beginning and end of each said scanned line of information;

variable length code converter means for converting said run length codes into variable length digital codes which are output as serial data bits;

dummy code generating means for generating dummy data bits;

word developing means for segregating said serial data bits into groups of N data bits and for outputing the N data bits of each group in parallel as word length codes, and in the event that the last word length code preceding a synchronizing signal is not filled with said serial data bits, said word developing means being operative to fill the unfilled word length code with said dummy data bits;

synchronizing code generating means for generating an N bit parallel synchronizing code; and first storage means responsive to said synchronizing signal and operative to store said word length codes and said synchronizing codes until they are transmitted.

5. In an information communication system as recited in claim 4, an improved decoding means comprising:

second storage means storing the transmitted word length codes and synchronizing codes previously stored in said first storage means;

means for separating the stored synchronizing codes from the stored word length codes to develop synchronizing signals;

means for transforming the word length codes stored in said second storage means into a serial stream of data bits; and converter means for converting said serial stream of data bits into reconstructed run length codes.

6. In an information communication system as recited in claim 4 wherein said means for transforming the stored word length codes includes a parallel input serial output shift register which shifts said stored word length signals out one bit at a time in response to said synchronizing signals; and wherein said means for converting includes a code converter which in response to one bit of said stored word length code and X additional bits of data generates a parallel output comprises of a control bit and X-bits forming a part of a reconstructed run length code, a multiplexer coupled to the output of said code converter and responsive to said control bit to output either said X-bits or a like number of ground bits, and an X-bit register responsive to said synchronizing signals and operative to couple the output of said multiplexer to the input of said code converter to provide said X additional bits of data, whereby each output of said code converter provides X-bits of the reconstructed run length code.

7. In an information communication system including information scanning means, encoding means, transmitting means, receiving means, decoding means and reproduction means, an improved decoding means for decoding data in the form of N-bit parallel words including word length codes and synchronizing codes, comprising:

storage means for storing said data;

means for separating the stored synchronizing codes from the stored word length codes to develop synchronizing signals;

means for transforming the word length codes stored in said storage means into a serial stream of data bits, said means for transforming the stored word length codes including a parallel input serial output shift register which shifts said stored word length signals out one bit at a time in response to said synchronizing signals;

means for converting said serial stream of data bits and developing reconstructed run length codes, said means for converting including a code converter which in response to one bit of said stored word length code and X additional bits of data generates a parallel output comprises of a control bit and X-bits forming a part of a reconstructed run length code, a multiplexer coupled to the output of said code converter and responsive to said control bit to output either said X-bits or a like number of ground bits, and an X-bit register responsive to said synchronizing signals and operative to couple the output of said multiplexer to the input of said code converter to provide said X additional bits of data, whereby each output of said code converter provides X-bits of the reconstructed run length code.

* * * * *